United States Patent
Barreiro et al.

(10) Patent No.: US 11,770,669 B2
(45) Date of Patent: Sep. 26, 2023

(54) AUDIO PERSONALISATION METHOD AND SYSTEM

(71) Applicant: Sony Interactive Entertainment Inc., Tokyo (JP)

(72) Inventors: Marina Villanueva Barreiro, Acoruña (ES); Danjeli Schembri, London (GB); Calum Armstrong, London (GB); Alexei Smith, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/502,302

(22) Filed: Oct. 15, 2021

(65) Prior Publication Data

US 2022/0124448 A1    Apr. 21, 2022

(30) Foreign Application Priority Data

Oct. 21, 2020   (GB) ..................................... 2016703

(51) Int. Cl.
*H04S 7/00*       (2006.01)
*A63F 13/25*     (2014.01)
(Continued)

(52) U.S. Cl.
CPC .............. *H04S 7/303* (2013.01); *A63F 13/25* (2014.09); *A63F 13/92* (2014.09); *H04R 29/001* (2013.01);
(Continued)

(58) Field of Classification Search
CPC ...... H04S 7/303; H04S 2420/01; A63F 13/25; A63F 13/92; H04R 29/001; H04R 2499/11
(Continued)

(56) References Cited

U.S. PATENT DOCUMENTS 10,728,690 B1    7/2020  Satongar
2012/0328107 A1  12/2012 Nyström
(Continued)

FOREIGN PATENT DOCUMENTS

KR    20180051411 A    5/2018
WO    2018041359 A1    3/2018

OTHER PUBLICATIONS

Extended European Search Report for corresponding EP Application No. 21200529.2, 24 pages, dated Mar. 11, 2022.
(Continued)

*Primary Examiner* — William A Jerez Lora
(74) *Attorney, Agent, or Firm* — Matthew B. Dernier, Esq.

(57) ABSTRACT

An audio personalisation method for a user includes: testing the user with an audio test, the audio test comprising: moving a portable device, comprising a position tracking mechanism and a speaker, to a plurality of predetermined test positions relative to the user's head; when within a threshold distance of a predetermined test position, playing a test sound through the speaker of the portable device; and detecting the test sound using a microphone proximate to each of the user's ears, and associating resulting measurement data with the predetermined test position, where the resulting measurement data derived from the detected test sounds is characteristic of the user's head morphology; for a corpus of reference individuals for whom respective HRTFs have been generated, comparing the measurement data from the user's audio test or a head-related transfer function 'HRTF' derived from this measurement data with corresponding measurement data of some or all respective reference individuals in the corpus or HRTFs of some or all respective reference individuals in the corpus; identifying a reference individual whose measurement data or HRTF best matches the measurement data or HRTF from the user's
(Continued)

audio test; and using the HRTF of the identified reference individual for the user.

16 Claims, 7 Drawing Sheets

(51) Int. Cl.
   *A63F 13/92*         (2014.01)
   *H04R 29/00*         (2006.01)
(52) U.S. Cl.
   CPC ....... *H04R 2499/11* (2013.01); *H04S 2420/01* (2013.01)
(58) Field of Classification Search
   USPC .................................. 381/1, 56, 58, 303, 310
   See application file for complete search history.

(56) References Cited

U.S. PATENT DOCUMENTS

| | | | |
|---|---|---|---|
| 2014/0192992 A1* | 7/2014 | Lee | H04M 1/72454 |
| | | | 381/60 |
| 2015/0312690 A1* | 10/2015 | Yuyama | H04R 29/002 |
| | | | 381/59 |
| 2017/0043484 A1* | 2/2017 | Kuffner | B25J 19/06 |
| 2017/0245081 A1 | 8/2017 | Lyren | |
| 2017/0272890 A1 | 9/2017 | Oh | |
| 2019/0124447 A1* | 4/2019 | Vincent | H04R 5/04 |
| 2020/0228915 A1* | 7/2020 | Wang | H04R 5/033 |

OTHER PUBLICATIONS

Combined Search Report and Examination Report for corresponding GB Application No. 22016703.7, 6 pages, dated Apr. 19, 2021.

* cited by examiner

AUDIO PERSONALISATION METHOD AND SYSTEM

BACKGROUND OF THE INVENTION

Field of the Invention

The present invention relates to an audio personalisation method and system.

Description of the Prior Art

Consumers of media content, including interactive content such as videogames, enjoy a sense of immersion whilst engaged with that content. As part of that immersion, it is also desirable for the audio to be realistic.

The present invention seeks to mitigate or alleviate this need.

SUMMARY OF THE INVENTION

Various aspects and features of the present invention are defined in the appended claims and within the text of the accompanying description and include at least:

In a first aspect, an audio personalisation method for a user is provided in accordance with claim 1.

In another aspect, an audio personalisation system for a user is provided in accordance with claim 15.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

An audio personalisation method and system are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

In an example embodiment of the present invention, a suitable system and/or platform for implementing the methods and techniques herein may be an entertainment device such as the Sony PlayStation® 4 or 5 videogame consoles. For the purposes of explanation, the following description is based on the PlayStation 4® but it will be appreciated that this is a non-limiting example.

Figure 1:
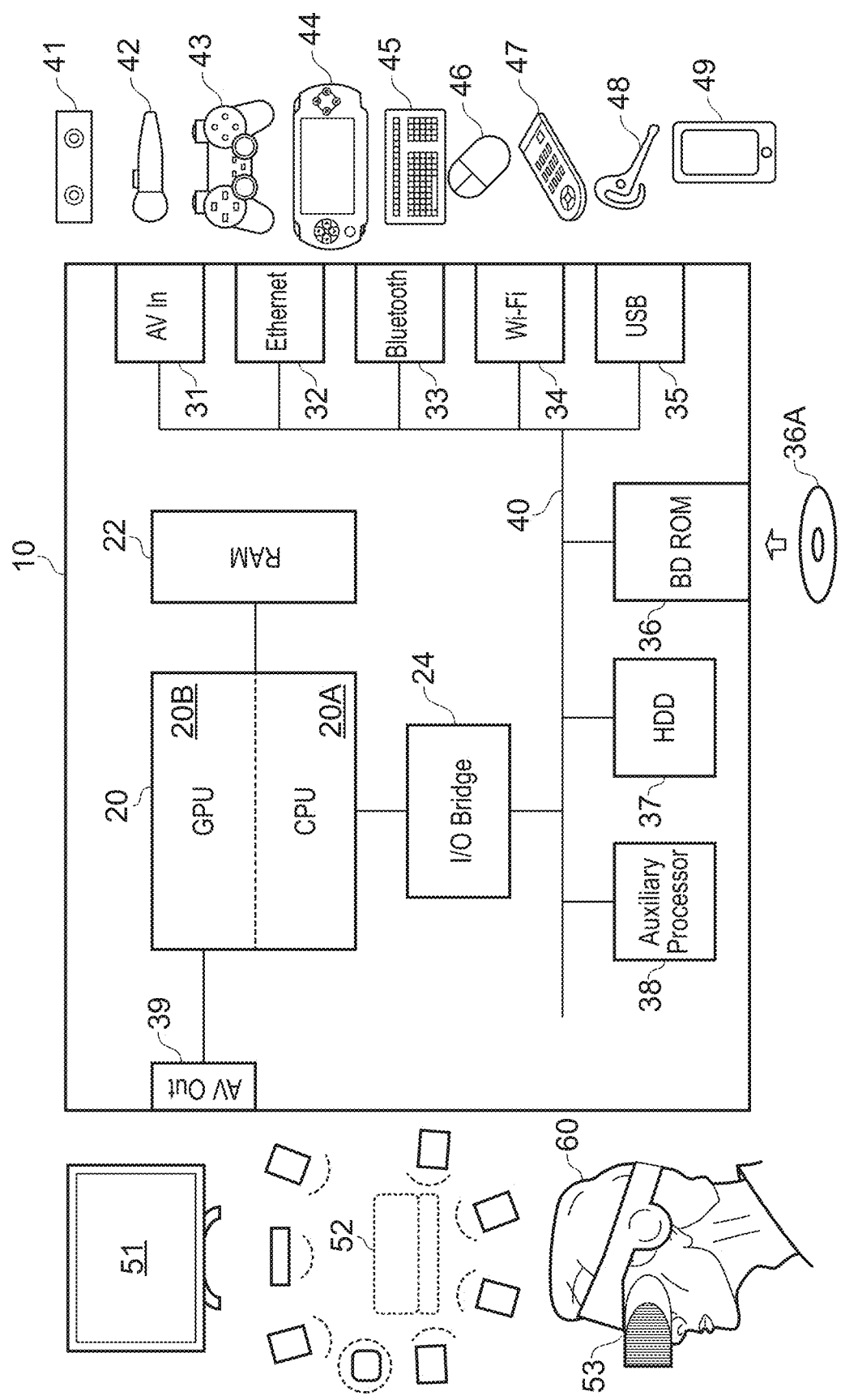
FIG. 1 is a schematic diagram of an entertainment device in accordance with embodiments of the present description.

Referring now to the drawings, wherein like reference numerals designate identical or corresponding parts throughout the several views, FIG. 1 schematically illustrates the overall system architecture of a Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI® port.

The peripheral devices may include a monoscopic or stereoscopic video camera 41 such as the PlayStation® Eye; wand-style videogame controllers 42 such as the PlayStation® Move and conventional handheld videogame controllers 43 such as the DualShock® 4; portable entertainment devices 44 such as the PlayStation® Portable and PlayStation® Vita; a keyboard 45 and/or a mouse 46; a media controller 47, for example in the form of a remote control; and a headset 48. Other peripheral devices may similarly be considered such as a printer, or a 3D printer (not shown), or a mobile phone 49 connected for example via Bluetooth® or Wifi Direct®.

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD® 9.0. The operating system may run on the CPU 20A, the auxiliary processor 38, or a mixture of the two. The operating system provides the user with a graphical user interface such as the PlayStation® Dynamic Menu. The menu allows the user to access operating system features and to select games and optionally other content.

When playing such games, or optionally other content, the user will typically be receiving audio from a stereo or surround sound system 52, or headphones, when viewing the content on a static display 51, or similarly receiving audio from a stereo surround sound system 52 or headphones, when viewing content on a head mounted display ('HMD') 53.

In either case, whilst the positional relationship of in game objects either to a static screen or the user's head position (or a combination of both) can be displayed visually with relative ease, producing a corresponding audio effect is more difficult.

This is because an individual's perception of direction for sound relies on a physical interaction with the sound around them caused by physical properties of their head; but everyone's head is different and so the physical interactions are unique.

Figure 2A:
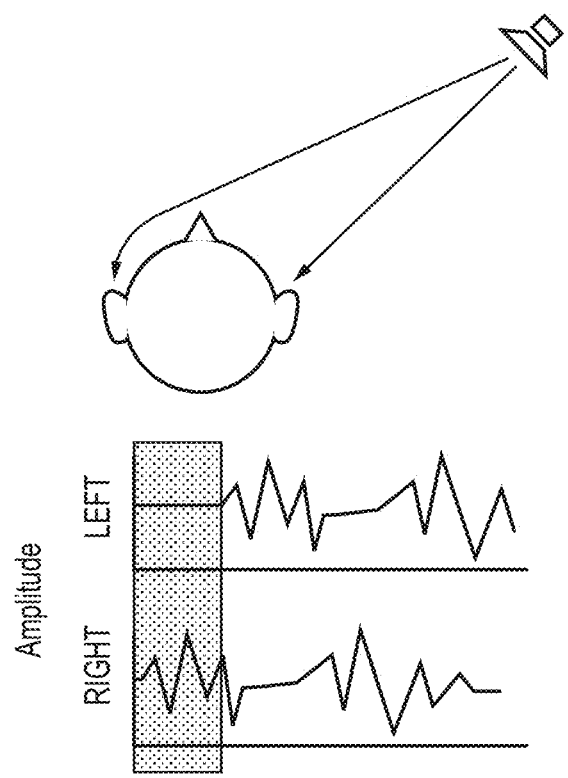
FIGS. 2A and 2B are schematic diagrams of head related audio properties.

Referring to FIG. 2A, an example physical interaction is the interaural delay or time difference (ITD), which is indicative of the degree to which a sound is positioned to the left or right of the user (resulting in relative changes in arrival time at the left and right ears), which is a function of the listener's head size and face shape.

Figure 2B:
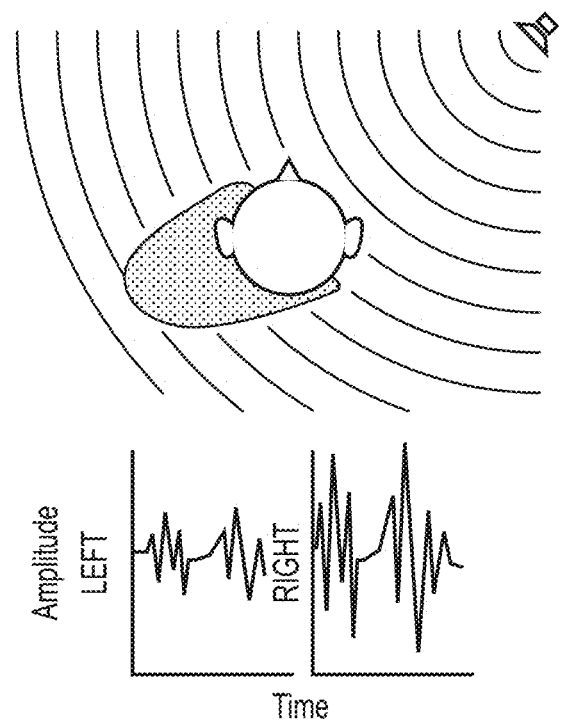

Similarly, referring to FIG. 2B, interaural level difference (ILD) relates to different loudness for left and right ears and is indicative of the degree to which a sound is positioned to the left right of the user (resulting in different degrees of attenuation due to the relative obscuring of the ear from the sound source), and again is a function of head size and face shape.

Figure 3A:
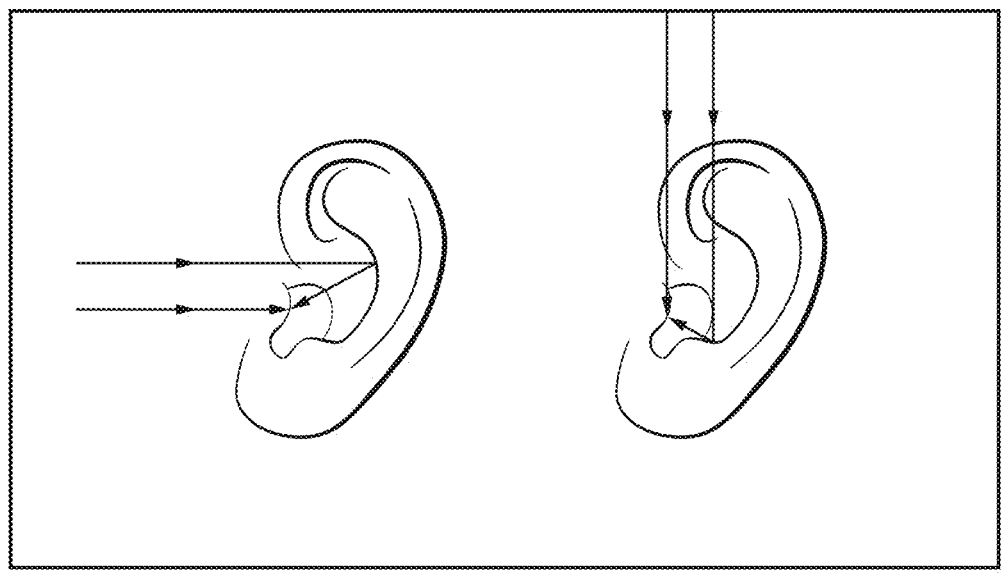
FIGS. 3A and 3B are schematic diagrams of ear related audio properties.
Figure 3B:
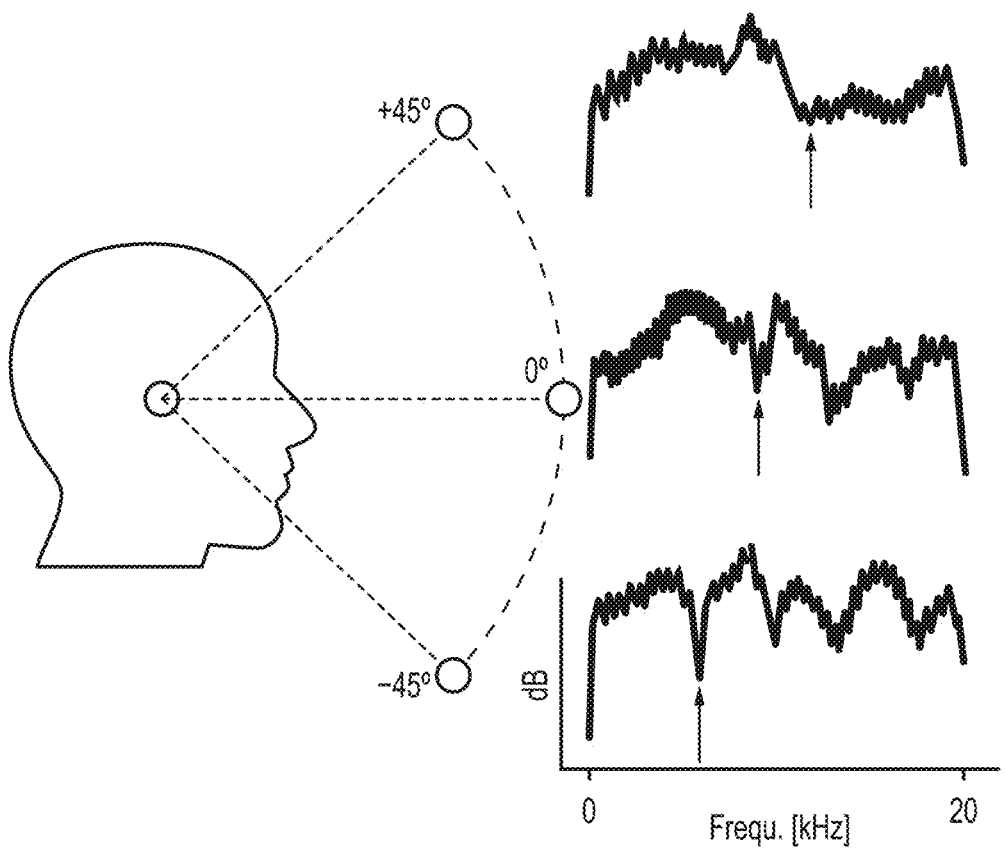

In addition to such horizontal (left-right) discrimination, referring also to FIG. 3A the outer ear comprises asymmetric features that vary between individuals and provide additional vertical discrimination for incoming sound; referring to FIG. 3B, the small difference in path lengths between direct and reflected sounds from these features cause so-called spectral notches that change in frequency as a function of sound source elevation.

Furthermore, these features are not independent; horizontal factors such as ITD and ILD also change as a function of source elevation, due to the changing face/head profile encountered by the sound waves propagating to the ears. Similarly, vertical factors such as spectral notches also change as a function of left/right positioning, as the physical shaping of the ear with respect to the incoming sound, and the resulting reflections, also change with horizontal incident angle.

The result is a complex two-dimensional response for each ear that is a function of monaural cues such as spectral notches, and binaural or inter-aural cues such as ITD and ILD. An individual's brain learns to correlate this response with the physical source of objects, enabling them to distinguish between left and right, up and down, and indeed forward and back, to estimate an object's location in 3D with respect to the user's head.

It would be desirable to provide a user with sound (for example using headphones) that replicated these features so as to create the illusion of in-game objects (or other sound sources in other forms of consumed content) being at specific points in space relative to the user, as in the real world. Such sound is typically known as binaural sound.

However, it will be appreciated that because each user is unique and so requires a unique replication of features, this would be difficult to do without extensive testing.

Figure 4A:
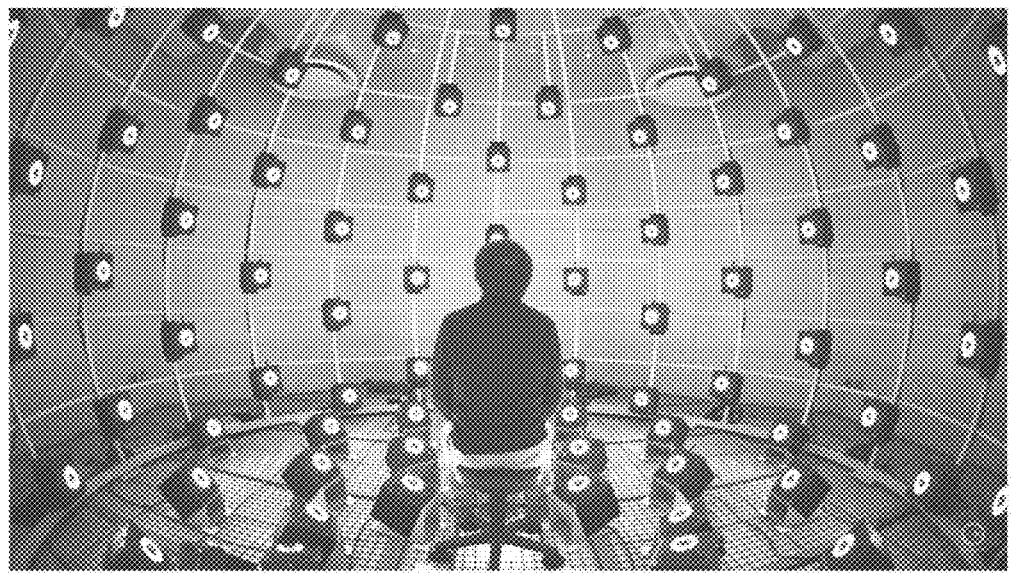
FIGS. 4A and 4B are schematic diagrams of audio systems used to generate data for the computation of a head related transfer function in accordance with embodiments of the present description.
Figure 4B:
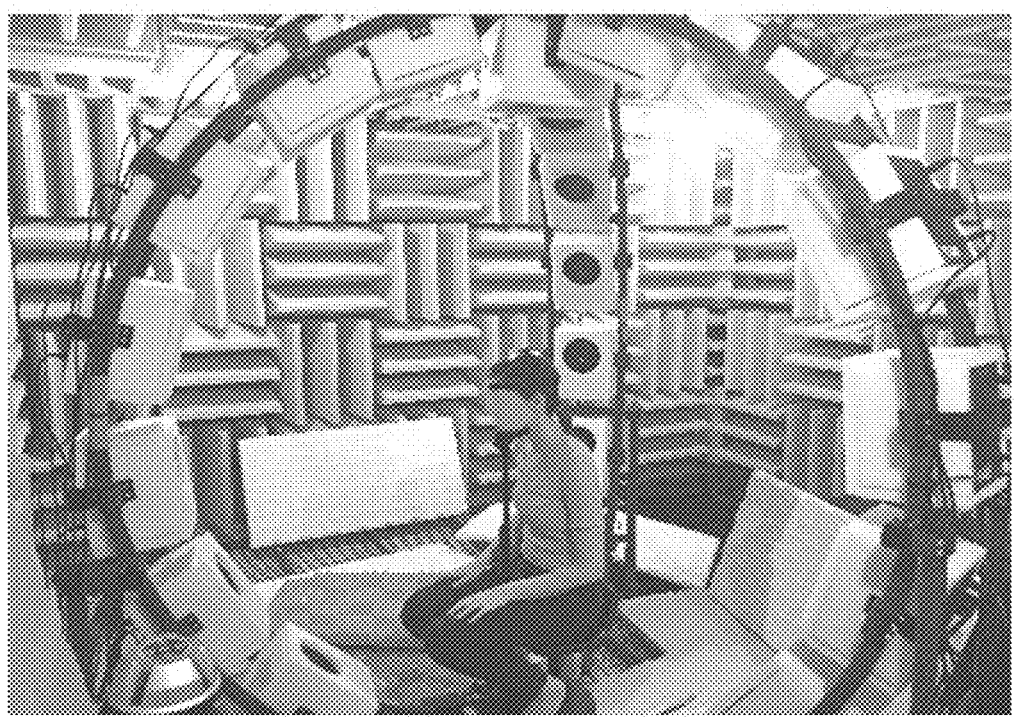

In particular, it is necessary to determine the in-ear response of the user for a plurality of positions, for example in a sphere around them; FIG. 4A shows a fixed speaker arrangement for this purpose, whilst FIG. 4B shows a simplified system where, for example the speaker rig or the user can rotate by fixed increments so that the speakers successively fill in the remaining sample points in the sphere.

Figure 5:
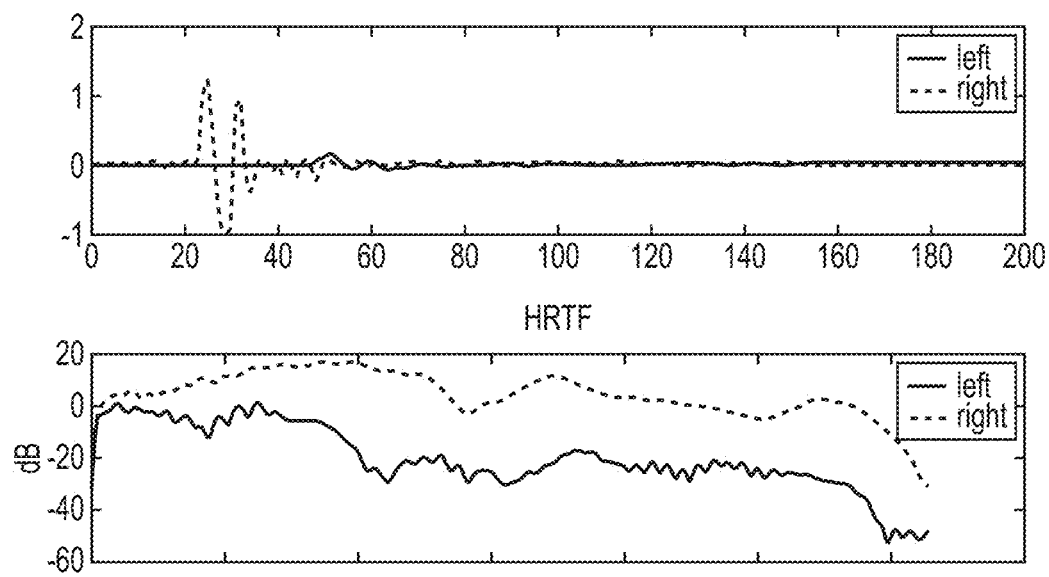
FIG. 5 is a schematic diagram of an impulse response for a user's left and right ears in the time and frequency domains.

Referring to FIG. 5, for a sound (e.g. an impulse such as a single delta or click) at each sampled position, a recorded impulse response within the ear (for example using a microphone positioned at the entrance to the ear canal) is obtained, as shown in the upper graph. A Fourier transform of such an impulse response is referred to as a frequency response, as shown in the lower graph of FIG. 5. Collectively, these impulse responses or frequency responses can be used to define a so-called head-related transfer function (HRTF) describing the effect for each ear of the user's head on the received frequency spectrum for that point in space.

Figure 6:
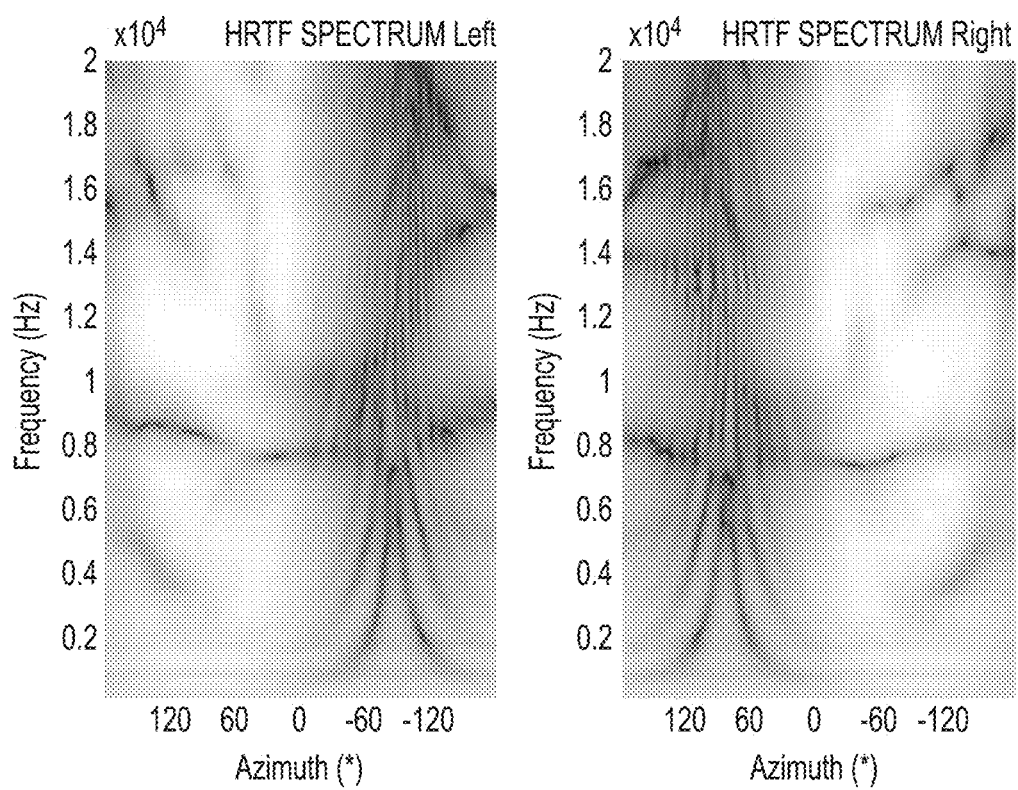
FIG. 6 is a schematic diagram of a head related transfer function spectrum for a user's left and right ears.

Measured over many positions, a full HRTF can be computed, as partially illustrated in FIG. 6 for both left and right ears (showing frequency on the y-axis versus azimuth on the x-axis). Brightness is a function of the Fourier transform values, with dark regions corresponding to spectral notches.

An HRTF typically comprises a time or frequency filter (e.g. an impulse or frequency response) for a series of positions on a sphere or partial sphere surrounding the user's head (e.g. for both azimuth and elevation), so that a sound, when played through a respective one of these filters, appears to come from the corresponding positon/direction. The more positions for which filters are measured, the better the HRTF is. For positions in between measured positions, interpolation between filters can be used. Again, the closer the measurement positions are to each other, the better (and less) interpolation there is.

It will be appreciated that obtaining an HRTF for each of potentially tens of millions of users of an entertainment device using systems such as those shown in FIGS. 4A and 4B is impractical, as is supplying some form of array system to individual users in order to perform a self-test.

Accordingly, in embodiments of the present description, a different technique is disclosed.

In these embodiments, full HRTFs for a plurality of reference individuals are obtained using systems such as those shown in FIGS. 4A and 4B, to generate a library of HRTFs. This library may be may initially be small, with for example individual representatives of several ages, ethnicities and each sex being tested, or simply a random selection of volunteers, beta testers, quality assurance testers, early adopters or the like. However over time more and more individuals may be tested with their resulting HRTF being added to the library.

By contrast, a user at home performs a simplified HRTF, as described herein below, and this is then compared to the HRTFs in the library to find a best match. The best match can then be used as an HRTF for that user, thereby providing a better sense of immersion that using either no HRTF or a default HRTF (for example obtained using a dummy head).

In an embodiment of the present description, a user is equipped with a handheld device with audio playback and position tracking capabilities. Examples of these include a mobile phone, a portable game console 44, and certain videogame controllers 43 that comprise speakers as well as accelerometers, such as the Sony® DualShock 4® controller or the Sony® DualSense® controller.

Herein, a mobile phone 49 is used for the purposes of explanation, with references to controllers as appropriate.

The mobile phone comprises an app that tracks the position of the phone as it is moved by the user through a space around the user's head. The tracking can be performed using any suitable tracking technique available to the phone, either singly or in combination, such as using a video camera of the phone to track motion (for example using simultaneous localisation and mapping or 'SLAM' tracking) and/or accelerometer and/or gyroscopic sensors of the phone.

For a videogame controller, the corresponding app would be located on the videogame console, and receive accelerometer and/or gyroscopic data from the controller to similar effect. Similarly optionally the console may use a separate camera (such as the PlayStation Eye® to track the controller, or a combination of the two approaches.

The phone can optionally analyse images captured by the phone to determine its position relative to the user's head; hence for example the phone may recognise when a user's face is directly in front of it (it does not necessarily have to recognise the specific user). In principle this can occur at any point during the user's movement of the phone around their head, and the relative movements of the phone with respect to that position can then be determined.

Meanwhile for a videogame controller, optionally a separate camera can enable the console to identify the user's head/face and the controller simultaneously to determine their relative positions.

Whilst the user will be asked to keep their head still, optionally in a refinement of the techniques herein images from the camera of the phone or console can also be analysed by the app to determine any movements of the user's head, which for example may occur due to the user's arm/shoulder movement when moving the device around. This can be used to refine the relative positon of the phone to the user's head.

For a phone not using its camera, or for a videogame controller without a separate camera, the user can instead be asked to hold the device at a predetermined initial position; for example, to hold it centrally in front of them at arm's length and at eye level; relative movement from this initial position can then be tracked.

In any event, using one of the above techniques the position of the device relative to the user's head can be determined as it is moved around the user's head.

The device can then output sounds for the purposes of generating an HRTF for the user. The device can emit sounds when the location of the device is within a threshold distance of a notional test position used in the full HRTFs performed for the reference users.

To a first approximation, the device can emit sounds when the location of the device is within a threshold distance of a notional test direction (e.g. a threshold angular distance, ignoring radial distance). This can be of assistance with accommodating different arm lengths and different flexibilities and dexterities of users by treating the test locations as if they were on a unit sphere, regardless of their actual distance from the user.

To a second approximation, alternatively or in addition the device can emit sounds when the location of the device is within a threshold distance of a notional test position (e.g. based on angular distance and radial distance, or equivalently a threshold distance from a notional position in Cartesian coordinates).

The threshold distance can be ±1 degree (equal to approximately ±1.5 cm at a typical arm's length), but may be larger or smaller; for example between ±0.1 degree and ±10 degrees. It will be appreciated that the device may start emitting sounds when within the threshold, but may only retain results (as discussed later herein) for the sound or sounds emitted when closest to the notional test location.

In this way, the user can move their device around their head, and it will emit sounds when within a threshold distance of a test location. Depending on the sounds used, the device may emit sounds effectively continually, but the corresponding results are only potentially retained for sounds within the threshold, optionally only for those closes to the corresponding notional test position.

Because the device (or an associated console) tracks the device, it can calculate which notional test positions are near to the device's current location. It can then use a display of the device, and/or a display associated with a console communicating with the device, to guide the user's motions towards a respective notional test position. The device can give visual feedback as to how close to the notional test position the device currently is, so that the user can strive to place it as close as possible to the ideal point. For example, an arrow or compass-like interface can point in a suitable direction, and a distance measure and/or cold/warm colour code or other suitable user interface element can indicate the distance to the notional test position.

Consequently the app on the phone or console can select which notional test positions to visit, or alternatively or in addition which notional test positions to additionally visit after the user has moved the device around, and direct the user to those positions.

In this way, the user is able to move the phone around their head to positions equivalent to those used in the full HRTF measurements performed for the reference individuals, and emit test sounds when at or near these positions. Clearly the user may also ask a friend to move the phone for them. In this case optionally measurements for notional test positions at greater than the user's arm's reach may also be obtained.

To obtain relevant measurements of these sounds to generate an approximate HRTF, microphones need to be located in each ear, typically at the same time but potentially individually for separate left and right ear measurement sequences.

The user can be provided with a pair of small microphones for this purpose, which may be placed in the entrance to each ear canal. The output of the microphones may then be provided to the app, for example via an input jack or port of the device; in the case of a phone, this may be an audio jack capable of supporting hands free calls, and/or a USB charging/data port or equivalent. In the case of a controller, this may be a microphone jack and/or a USB charging/data port or equivalent, with the controller relaying the audio to the console app, optionally after pre-processing such as analogue to digital conversion. Alternatively for the controller, the microphone input may go to the console directly via a wired or wireless connection. In this case optionally a phone of the user may act as a wireless link from the microphones to the console.

If such a pair of small microphones is not available, then alternatively microphones within a pair of headphones with near-ear microphones (such as noise cancelling headphones) may be used. Alternatively earphones (e.g. in-ear earphones) may be used as microphones—speakers can double as microphones when not being driven, although often the quality of the detected audio signal is low.

Hence alternatively, if a pair of microphones is not available or not suitable for use, either in the form of a small pair of microphones, or microphones within headphones, or earphones acting as microphones, then optionally a single microphone may be used for separate left and right ear measurements.

Figure 7:
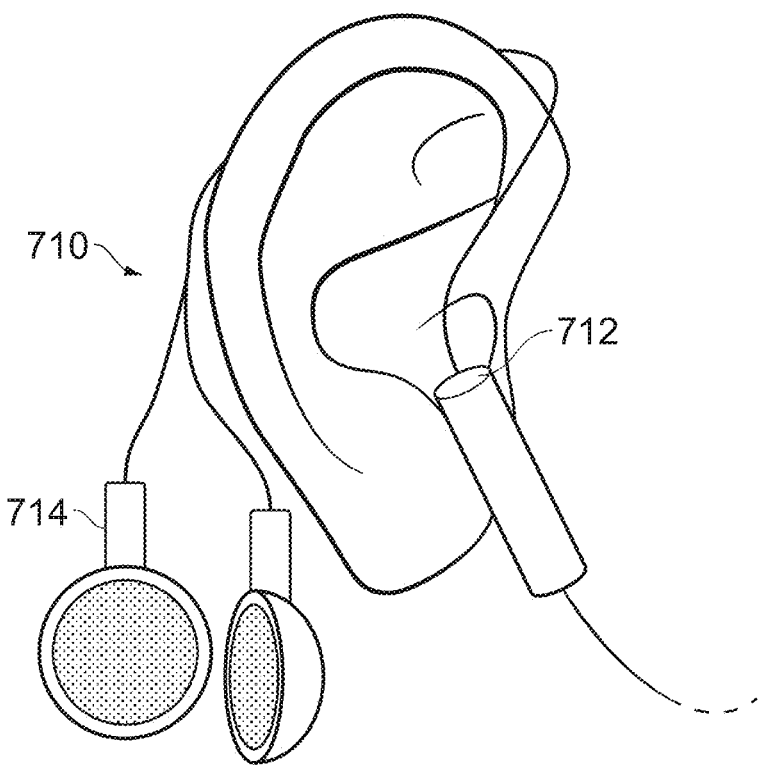
FIG. 7 is a schematic diagram of a microphone measuring sound at a user's ear, in accordance with embodiments of the present description.
Figure 8:
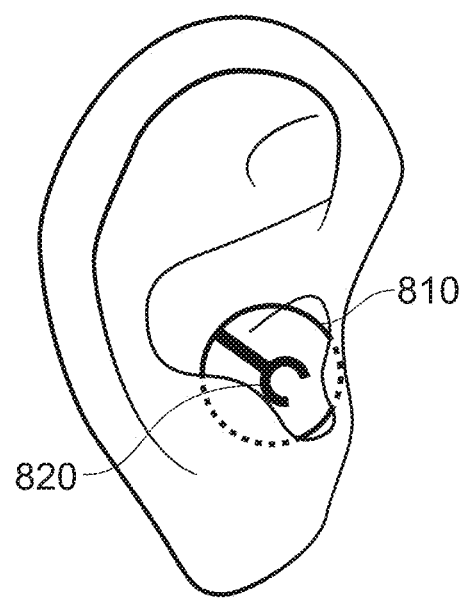
FIG. 8 is a schematic diagram of a microphone holding clip, in accordance with embodiments of the present description.

FIG. 7 illustrates a possible approach, with a pair of hands-free earphones 710 being arranged over the user's ear so that the hands free microphone 712 is positioned within the incisura intertragica channel normally occupied by a pendant part of each earphone 714. Whilst this is convenient and also places the microphone near the entrance to the user's ear canal, it is not the only option. For example referring now also to FIG. 8, a small plastic holder 810 could be supplied to fit within the concha of the outer ear that has a clip or mount 820 to hold the microphone of the hands-free earphones (or indeed each of the small microphones discussed previously) just at the entrance of the ear canal. A similar arrangement could be provided by a clip, similar to a clip-on earring, positioning a mount on the lobule to hold the microphone near the ear canal.

As noted previously herein, the interaural delay or time difference (ITD) is a significant element of an HRTF. When microphones are simultaneously available for each ear, this time difference can be measured directly for each microphone.

Meanwhile for the case where only one microphone is available, the propagation time for the signal for a given notional test position can be used. Hence for example when first testing the left ear, the user may hold the device 60 cm to the left of their left ear, resulting in a propagation time of 1.76 ms for the sound. Subsequently when testing their right ear, when holding the device again 60 cm to the left of their left ear the resulting propagation time may be 2.35 ms, caused by an additional 20 cm journey to the right ear. Hence in this case the ITD could be calculated for that position as 0.59 ms. This approach could be used for each position that is repeated for the left and right ears using one microphone.

In a similar manner, when microphones are simultaneously available for each ear then interaural level differences (ILDs) can be measured directly for each ear, but if only one microphone is available then respective levels for each notional test positon (or closest point thereto) for each ear can be recorded and compared to obtained the ILD in a similar manner to the ITD discussed above.

Meanwhile other features contributing to the HRTF as discussed elsewhere herein, such as frequency notches for respective ears, can be measured for respective microphone placements whether in both ears simultaneously or sequentially.

In this way, using either one or two microphones, a set of measurements for the different notional positions of the full HRTF performed for the reference individuals can be obtained.

The measurements are typically stored as impulse responses for the sounds, as discussed previously herein, for use in characterising the user's approximate HRTF. Alternatively the microphone recordings can be retained for calculation of the HRTF later.

In any event, the microphone (or headphone/earphone equivalent) signals are used to model an approximate HRTF for the user in a similar manner to the microphone signal is used for the full HRTFs performed a reference individuals. This model may be implemented by the app in the mobile phone or videogame console, or the relevant data may be sent to a remote server (for example in the case that the computational overhead is impractical for the mobile phone to complete a reasonable period of time).

Once computed, the user's approximate HRTF can be compared with the HRTFs in the library of HRTFs compiled from reference individuals.

The closest matching HRTF in the library, optionally subject to a minimum threshold difference measure between his HRTF and the user's approximate HRTF, can then be selected for use with that user.

This will provide a more immersive audio experience than normal stereo or surround sound, or a default HRTF based upon a reference dummy head.

Optionally, if the closest matching HRTF in the library is different to the user's approximate HRTF by more than the minimum threshold difference measure, then the user's approximate HRTF can be selected for use with that user. Further optionally, this can be made subject to a threshold number of notional test positions being used to obtain measurements, this being indicative of the quality of the resulting HRTF.

As an alternative to comparing the HRTFs in the library, optionally the impulse response values (or equally the frequency response values) for respective notional test positions of the user and the reference individuals can be compared to find the closest overall match, and the corresponding full HRTF for the best matching reference individual may then be used for that user. This approach enables the computation of the approximate HRTF to be bypassed.

Hence more generally measurement data derived from received signals received at the user's ears and characteristic of the user's head morphology is compared with corresponding data from the reference individuals, whether this data is in the form of an approximate HRTF or a set of impulse response values or equally a set of frequency response values. It can be assumed that references herein to impulse response values also encompass frequency response values unless otherwise specified.

Having obtained the user's measurement data, it can then be kept on record; consequently if a new reference individual is added to the library, the user's data can be tested against that of the new reference individual to see if they are a better match, for example as a background service provided by a remote server. If a better match is found, then the better indicated closest matching HRTF may be installed as the HRTF for that user, thereby improving their experience further.

The individuals chosen to expand the library can also be selected judiciously; one may assume that for a representative set of reference individuals, a random distribution of users will match to each reference individual in roughly equal proportions; however if a comparatively high number of users match to a reference individual (for example above a threshold variance in the number of users matching to reference individuals), then this is indicative of at least one of the following:

i. The population of users is not random (e.g. due to demographics), and so there are more people similar to this reference individual than the norm; and ii. The set of reference individuals is not sufficiently representative of the users and there is a gap in the proxy result space surrounding this particular reference individual, causing people who in fact are not that similar to the individual to be matched to them for lack of a better match.

In either case, it would be desirable to find other reference individuals who are morphologically similar to the one currently in the library, in order to provide more refined discrimination within this sub-group of the user population. Such individuals may optionally be found for example by comparing photographs of the candidate reference individual, for example face-on and side on (showing an ear) to help with automatically assessing head shape and out ear shape. Such individuals may also be found using other methods, such as identifying individuals with similar demographics, or inviting close family relatives of the existing reference individual.

In this way, optionally the HRTF library can be grown over time in response to the characteristics of the user base.

Where it is not possible to find a suitable new reference individual, or whilst waiting for one to be added to the library, optionally for a user that is close to two or more reference individuals but not within a threshold degree of match of any of them, optionally a blend of the HRFTs of the two or more reference individuals may be generated to provide a better estimate of their own HRTF. This blend may be a weighted average or other combination responsive to the relative degree of match (e.g. proximity in location error space for a vector of error values of location estimates) for two or more reference individual's HRTFs.

The above description assumes that the home user tests a sufficient number of notional test positions to form adequate HRTF for comparison purposes. However this may require testing a large number of positions, typically over the surface of a sphere or partial sphere, thereby capturing the effect of the interconnected relationship between the horizontal and vertical audio features of ITD, ILD and spectral notches discussed previously.

It will be appreciated however that a test may take a long time, and be unwelcome or impractical to a home user, or simply tiring for their arms. However, it will also be appreciated that the test can be performed incrementally, with additional notional test positions adding to the set of impulse response values for the user.

As the number of impulse response values increases, an approximate HRTF generated from them improves in accuracy and will serve to better discriminate between reference HRTFs in the library, if HRTFs are being compared. Meanwhile if sets of impulse response data are being compared, then the comparison can be limited to those notional test positions for which impulse responses have been measured; in this case again it will be appreciated that as more of these test positions are populated with user data, and hence the comparison is expanded to a larger proportion of the reference datasets, the discrimination between these reference datasets improves. Again, in lieu of impulse response values, frequency response values may equally be used.

Hence in principle the user can revisit the test process, filling in more of the notional test positions for each or both ears to incrementally improve the quality and confidence of match they are likely to obtain between candidate reference datasets and their own measurement data.

Because of this, optionally also aspects of the test can be prioritised, or performed in a preferential order, and refined with more data over any successive test sessions.

For example, measuring centreline elevation impulse or frequency response values can provide a first estimate of the elevation notch for the user's ears (or more precisely, a pattern of position estimation errors characteristic of that notch). Similarly, measuring centreline horizontal positions can provide a first estimate for the ITD and/or ILD of the user. The user can be guided to these positions via a device screen and/or a screen used by the console, as described previously herein.

The user results of this testing session (e.g. the impulse or frequency response values) can be compared with just the corresponding results for the reference individuals to find an initial closest match. Alternatively or in addition an approximate HRTF can be generated just from these results and compared with the HRTFs. Where both approaches are used, clearly if the same reference individual is selected by both techniques then this provides a high degree of confidence. Where they disagree, and two candidate reference HRTFs are plausible, then the user may be invited to audition both of them, or the one corresponding to the best matching HRTF may be selected.

In any event, the corresponding HRTF is still likely to provide a better experience for the user than the default.

The user can then revisit the test sat different times to continue the test and so populate their set of results.

The as described previously in relation to centrelines, the chosen notional test positions can prioritise certain locations likely to provide particular discrimination for a given spectral notch, or provide ITD and/or ILD measurements across subsequent elevations; alternatively or in addition test positions are simply added as the user moves their device into the threshold region surrounding their locations.

The user can re-do the test from scratch as they wish; for example a growing child may wish to do so annually as their head shape changes as they grow. Similarly an older individual may re-take the test if they suspect some hearing loss in either ear.

Further refinements to the technique include but are not limited to the following.

In an embodiment of the description, the frequency response of the combined phone speaker and microphone may be calibrated by playing reference sounds from the phone directly to the microphone whilst not in the users ear; the sounds may for example comprise white noise to provide a broad frequency spectrum of sound, and/or may use a chirp or other moving frequency tone to populate some or all of the frequency range modelled by the HRTF. It will be appreciated that the frequency spectrum of the source sound can be compared to the frequency spectrum of the sound measured by the microphone, and the disparity between the two represents the frequency response of the combined phone and microphone system. Optionally the results for the subsequent in ear measurements can be corrected to account for this frequency response.

In an embodiment of the description, the make and model of the user's phone is provided to the app; the app may then look up the position of the speakers on that model of phone relative to a centre point of the phone and/or the camera of the phone (depending on what is used to determine phone position during tracking). This relative position can be taken into account to determining whether the speaker of the phone, rather than a centre point of the phone or the camera, is within a threshold distance of a notional test position. Meanwhile typically for a standard videogame controller, this relationship is fixed and known in advance, and so the relative position of the speaker can be taken into account automatically.

In an embodiment of the description, the device provides feedback when it is being held at an angle more than the threshold amount away from a predetermined position; hence for example a phone may by default be held upright and facing toward the user, whilst a videogame controller may be held horizontally and facing toward the user; in either case, if the user's hold on the device causes it to change orientation by more than the threshold amount, this may be notified to the user either visually, audibly or through haptic feedback. This can help ensure that the audio transmission from the device is consistent, as some such devices can have non-uniform sound levels as a function of angle.

Similarly if measured sound levels from the microphones are notably different between adjacent or nearby notional test positions, this may indicate for example that the user has inadvertently blocked or muffled the speaker of the device with their hand; in this instance the user may be prompted to change their hold on the device.

In an embodiment of the description, additional notional test positions are optionally available beyond arm's reach of the user, which may be accessed by a friend holding the device. These test positions may for example help with further distinguishing the HRTF, as near field and far field sound sources can have different perceived effects. Hence in the case where a user performs the test by themselves, the resulting approximate HRTF may be considered incomplete but nevertheless compared against the full HRTFs for the reference individuals.

Alternatively, full HRTFs are compiled for notional test positions within arms reach of reference individuals and separately for far field positions accessible only by an assistant. In this case, where the user's dataset only comprises notional test positions within arms reach, then these are compared with corresponding data for the notional test positions within arms reach (e.g. the HRTF for these notional test positions, or corresponding impulse or frequency response data). Meanwhile where the user's dataset also comprises notional test positions for far field positions, then these can be compared with the corresponding data for the far field notional test positions (e.g. the HRTF for these notional test positions, or corresponding impulse or frequency response data). Hence separate near field and far field HRTFs can optionally be selected. Optionally, the near field and far field HRTFs of a single reference individual with the best combined matches may be selected. Alternatively the near field and far field HRTFs of different reference individuals with respective best matches may be selected.

It will also be appreciated that in embodiments of the description, different sounds may be useful for different aspects of the test process, so that different sounds may be played at different notional test positions, or multiple different sounds may be played at the same position to highlight different audio properties. Hence for example tests sounds may occupy broad frequency ranges (e.g. bursts of white noise, or pops and bangs), which can be useful for some properties (e.g. some notch measures), whilst test sounds at narrower frequency ranges can be useful for others; e.g. pink noise below around 1.5 kHz may be more useful for ITD based estimates, whilst blue noise above 1.5 kHz may be more useful for ILD based estimates. Other sounds such as chirps or pure tones may similarly be used, as may natural sounds such as speech utterances, music or ambience noises. Hence a mix of wide and narrow band sounds may be used during testing.

The description herein has referred to predetermined test positions, being common to both the measurements for the reference individuals and the home users and thus enabling a more direct comparison. However, optionally the reference individuals may be tested on more predetermined test positons than the home users, for example where the additional test positions are useful for improving the quality of HRTF, but are not needed for the purposes of sufficient discrimination between sets of measurement data in the library when compared with user measurement data.

Similarly, some or all test positions may not be predetermined as such, for either the home user or in principle the reference individuals; for example in either case the person may move their portable device around their head whilst the position is tracked/estimated; measurements can then be continuously or periodically obtained and associated with tracked/estimated positions. This data for users can still be compared with the measurement data for reference individuals in the library, even if largely based on different measurement positions around the head. Firstly, if an approximate HRTF is calculated for the home user from their data, this can still be compared to the HRTFs in the library; meanwhile if impulse or frequency response measurements are compared, then these can be interpolated between existing measurement positions, either in the library data or in the user data to correspond with a position in the other data set (or both can be interpolated to represent a common positon). Hence whilst predetermined test positions simplify the comparison process, they are not essential. Conversely, where the description or claims refer to test positions, this also encompasses predetermined test positions.

Figure 9:
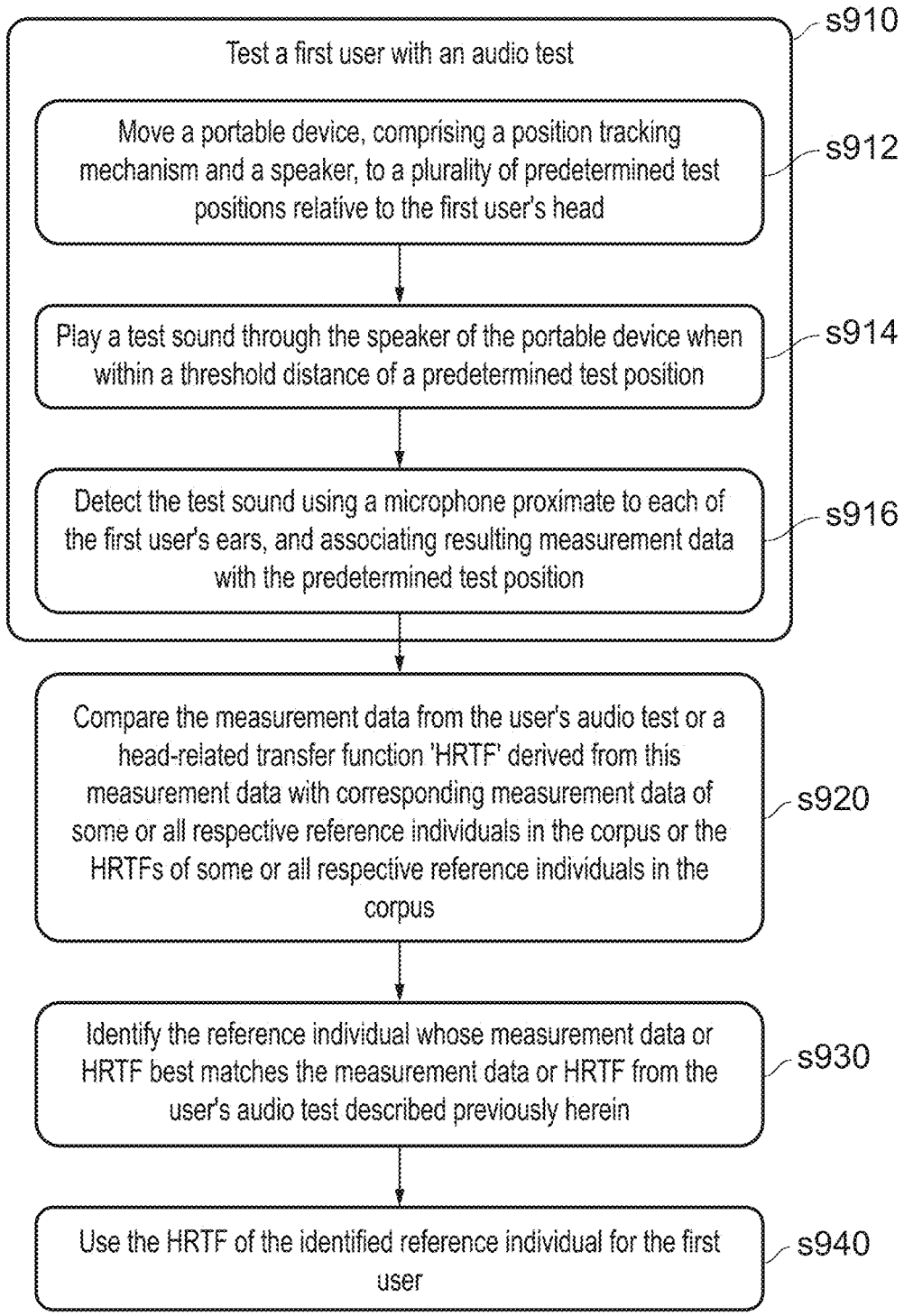
FIG. 9 is a flow diagram of an audio personalisation method for a user, in accordance with embodiments of the present description.

Referring now also to FIG. 9, in a summary embodiment of the present description, an audio personalisation method home users comprises the following steps.

In a first step s910, test a home user ('first user') with an audio test, the audio test comprising:
In a first sub-step s912, moving a portable device comprising a position tracking mechanism and a speaker (such as a phone or controller, as described previously herein), to a plurality of test positions relative to the first user's head.
In a second substep s914, playing a test sound through the speaker of the portable device, as described previously herein.
In a third substep s916, detecting the test sound using a microphone at least proximate to each of the first user's ears, as described previously herein, and associating resulting measurement data with the corresponding test position, as described previously herein.
The resulting measurement data derived from the detected test sounds is characteristic of the user's head morphology, as described previously herein.
In a second step s920, for a corpus of reference individuals for whom respective HRTFs have been generated, comparing the measurement data from the user's audio test (e.g. impulse or frequency response values) or a head-related transfer function 'HRTF' derived from this measurement data, with corresponding measurement data of some or all respective reference individuals in the corpus or the HRTFs of some or all respective reference individuals in the corpus, as described previously herein.
In a third step s930, identifying the reference individual whose measurement data or HRTF best matches the measurement data or HRTF from the user's audio test, as described previously herein.
Then in a fourth step s940, using the HRTF of the identified reference individual for the first user, as described previously herein.

In this way, advantageously a good quality HRTF can be obtained based on measurements generated using the user's own equipment (e.g. phone or controller, and optionally hands-free earphones), or with minimal additional equipment (e.g. one or two small microphones for in-ear recording, and/or a holding clip).

It will be apparent to a person skilled in the art that variations in the above method corresponding to operation of the various embodiments of the method and/or apparatus as described and claimed herein are considered within the scope of the present disclosure, including but not limited to that:

- the test positions are predetermined test positions, and the step of playing a test sound comprises playing the test sound when within a threshold distance of a predetermined test position, as described previously he;
  - in this case, optionally resulting measurement data for a predetermined test position is only associated with the predetermined test position for the test sound played when closest to the predetermined test position, as described previously herein;
- resulting measurement data comprises one or more selected from the list consisting of interaural time difference, interaural level difference, an impulse response based on the test sound, and a frequency response based on the test sound, as described previously herein;
- the audio test comprises performing the audio test on each of the user's ears sequentially using one microphone, as described previously herein;
- the method comprises steps of calculating a propagation time for detection of a sound from a particular predetermined test position for each ear during respective audio tests, and calculating an interaural time difference for the particular predetermined test position based on the difference between the two propagation times, as described previously herein;
- the method comprises a step of visually directing a user to move the portable device towards a predetermined test position using a display, responsive to the currently tracked positon of the portable device and the position of at least a first predetermined test position, as described previously herein;
- predetermined test positions are defined without reference to a distance from the user's head, as described previously herein;
- In addition to test positions provided within a predetermined distance from the user, additional test positions are provided at more than a predetermined distance from the user, and the method comprises comparing user measurement data or an HRTF for all tested test positions within the predetermined distance with corresponding measurement data or an HRTF from tested test positions within a predetermined distance of some or all respective reference individuals in the corpus, comparing user measurement data or an HRTF for all tested test positions at more than a predetermined distance with corresponding measurement data or an HRTF from tested test positions at more than a predetermined distance of some or all respective reference individuals in the corpus, identifying the respective reference individual whose measurement data or HRTF best matches the measurement data or HRTF from the user's audio test for the tested test positions within the predetermined distance, using the HRTF of the identified reference individual for the first user for sound sources within the predetermined distance, identifying the respective reference individual whose measurement data or HRTF best matches the measurement data or HRTF from the user's audio test for the tested test positions at more than the predetermined distance, and using the HRTF of the identified reference individual for the first user for sound sources at more than the predetermined distance, as described previously herein;
- the method comprises a step of estimating the position of the sound source with respect to the predetermined test positions based upon a relative distance between a tracking locus of the portable device and the speaker of the portable device, as described previously herein;
- the method comprises a step of notifying the user if the orientation of the device with respect to the user's head changes by more than a predetermined amount, as described previously herein;
- the method comprises a step of determining a combined frequency response of the portable device speaker and the or each microphone when not proximate to the user's ear, and correcting detected test sounds responsive to this combined frequency response, as described previously herein;
- the user measurement data comprises one or more parameters estimated from a photograph of the user's ear, as described previously herein; and
- the method comprises one or more steps selected from the list consisting of: repeating the comparison, identification and using steps if the number of reference individuals in the corpus increases by a predetermined amount; increasing the number of reference individuals in the corpus if the relative number of users using the HRTF of one reference individual compared to others increases by more than a threshold amount; repeating the comparison, identification and using steps if a partial audio test of the user is complemented by one or more additional audio tests of the user; if no single reference individual has a match with the user to within a predetermined tolerance, blending the HRTFs of the closest M matching reference individuals, where M is a value of two or more, and using the blended HRTF for the user; directing a user to place the portable device at predetermined test positions within a predetermined sequence; directing a user to place the portable device at predetermined test positions within a subset of predetermined test positions for successive parts of one or more audio tests of the user; and holding a microphone proximate to the entrance of the user's ear canal using a microphone clip mountable on the ear, as described previously herein.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Whilst the data needed to calculate an HRTF may be specialist equipment such as that shown in FIGS. 4A and 4B, the audio personalisation system for a user that is used to perform the audio tests, and perform steps such as associating measurement data with predetermined locations, comparing results, identifying best matches, and using a corresponding HRTF, may be a videogame console such as the PS4® or PS5®, or an equivalent development kit, PC or the like, optionally operating in conjunction with a remote server, and with a videogame controller operating as the portable device; or alternatively it may be a phone or tablet, combining both the role of the portable device and some or all of the remaining functions of the audio personalisation system (for example using an app that is either stand-alone, or operates in conjunction with a remote server and/or videogame console).

Accordingly in a summary embodiment of the present description, an audio personalisation system (10, 43; 49) for a user comprises the following features.

- a portable device (such as videogame controller 43 or mobile phone or tablet 49), comprising in turn a position tracking mechanism and a speaker (not shown, but typically comprising one or more of a camera and/or motion detectors such as accelerometers/gyroscopes), wherein the portable device is adapted (for example by suitable software instructions) to play a test sound through the speaker of the portable device, as the portable device is moved to a plurality of test positions relative to the user's head during an audio test of the user;
- at least a first microphone (such as a pair of small microphones, not shown, or a microphone 712 of a phone's hands-free kit or earphones) adapted to detect the test sound when at least proximate to each of the user's ears (e.g. simultaneously if the microphones are available, or sequentially in separate tests if only one is available);
- an association processor (e.g. CPU 20 or a CPU of the phone or a server, not shown) adapted (for example by suitable software instructions) to associate resulting user measurement data with the corresponding test position, wherein the resulting measurement data derived from the detected test sounds is characteristic of the user's head morphology;
- a comparison processor (e.g. CPU 20 or a CPU of the phone or a server, not shown) adapted (for example by suitable software instructions) to compare the measurement data from the user's audio test or a head-related transfer function 'HRTF' derived from this measurement data with corresponding measurement data of some or all respective reference individuals in a corpus of reference individuals for whom respective HRTFs have been generated, or HRTFs of some or all respective reference individuals in the corpus;
- an identification processor (e.g. CPU 20 or a CPU of the phone or a server, not shown) adapted (for example by suitable software instructions) to identify a reference individual whose measurement data or HRTF best matches the measurement data or HRTF from the user's audio test;
- and an adoption processor (e.g. CPU 20 or a CPU of the phone or a server, not shown) adapted (for example by suitable software instructions) to cause the HRTF of the identified reference individual to be used for the user.

It will be appreciated that the above apparatus may also be adapted by suitable software instruction or hardware to implement the remaining methods and techniques described herein.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An audio personalisation method for a user, comprising the steps of:
    testing the user with an audio test, the audio test comprising:
    moving a portable device, comprising a position tracking mechanism and a speaker, to a plurality of predetermined test positions relative to the user's head;
    playing a test sound through the speaker of the portable device when within a threshold distance of a predetermined test position; and
    detecting the test sound using a microphone at least proximate to each of the user's ears, and associating resulting measurement data with the corresponding test position,
    wherein the resulting measurement data derived from the detected test sounds is characteristic of the user's head morphology;
    for a corpus of reference individuals for whom respective head-related transfer functions 'HRTF' s have been generated, comparing the measurement data from the user's audio test or an HRTF derived from this measurement data with corresponding measurement data of some or all respective reference individuals in the corpus or HRTFs of some or all respective reference individuals in the corpus;
    identifying a reference individual whose measurement data or HRTF best matches the measurement data or HRTF from the user's audio test; and
    using the HRTF of the identified reference individual for the user.

2. An audio personalisation method according to claim 1, in which: resulting measurement data for a predetermined test position is only associated with the predetermined test position for the test sound played when closest to the predetermined test position.

3. An audio personalisation method according to claim 1, comprising the step of:
    visually directing a user to move the portable device towards a predetermined test position using a display, responsive to the currently tracked position of the portable device and the position of at least a first predetermined test position.

4. An audio personalisation method according to claim 1, in which:
    resulting measurement data comprises one or more of:
    i. interaural time difference;
    ii. interaural level difference;
    i. an impulse response based on the test sound; and
    ii. a frequency response based on the test sound.

5. An audio personalisation method according to claim 1, in which:
    the audio test comprises performing the audio test on each of the user's ears sequentially using one microphone.

6. An audio personalisation method according to claim 5, comprising the steps of:
    calculating a propagation time for detection of a sound from a particular test position for each ear during respective audio tests; and
    calculating an interaural time difference for the particular test position based on the difference between the two propagation times.

7. An audio personalisation method according to claim 1, in which:

test positions are defined without reference to a distance from the user's head.

8. An audio personalisation method according to claim 1, in which:

in addition to test positions located within a predetermined distance from the user; additional test positions are located at more than a predetermined distance from the user; and the method comprises comparing user measurement data or an HRTF for all tested test positions within the predetermined distance with corresponding measurement data or an HRTF from tested test positions within a predetermined distance of some or all respective reference individuals in the corpus;

comparing user measurement data or an HRTF for all tested test positions at more than a predetermined distance with corresponding measurement data or an HRTF from tested test positions at more than a predetermined distance of some or all respective reference individuals in the corpus;

identifying the respective reference individual whose measurement data or HRTF best matches the measurement data or HRTF from the user's audio test for the tested test positions within the predetermined distance;

using the HRTF of the identified reference individual for the first user for sound sources within the predetermined distance;

identifying the respective reference individual whose measurement data or HRTF best matches the measurement data or HRTF from the user's audio test for the tested test positions at more than the predetermined distance; and using the HRTF of the identified reference individual for the first user for sound sources at more than the predetermined distance.

9. An audio personalisation method according to claim 1, comprising the step of:

estimating the position of the sound source with respect to the test positions based upon a relative distance between a tracking locus of the portable device and the speaker of the portable device.

10. An audio personalisation method according to claim 1, comprising the step of: notifying the user if the orientation of the device with respect to the user's head changes by more than a predetermined amount.

11. An audio personalisation method according to claim 1, comprising the step of:

determining a combined frequency response of the portable device speaker and the or each microphone when not proximate to the user's ear, and correcting detected test sounds responsive to this combined frequency response.

12. An audio personalisation method according to claim 1, in which:

the user measurement data comprises one or more parameters estimated from a photograph of the user's ear.

13. An audio personalisation method according claim 1, comprising one or more of:

i. repeating the comparison, identification and using steps if the number of reference individuals in the corpus increases by a predetermined amount;

ii. increasing the number of reference individuals in the corpus if the relative number of users using the HRTF of one reference individual compared to others increases by more than a threshold amount;

iii. repeating the comparison, identification and using steps if a partial audio test of the user is complemented by one or more additional audio tests of the user;

iv. if no single reference individual has a match with the user to within a predetermined tolerance, blending the HRTFs of the closest M matching reference individuals, where M is a value of two or more, and using the blended HRTF for the user;

v. directing a user to place the portable device at predetermined test positions within a predetermined sequence;

vi. directing a user to place the portable device at predetermined test positions within a subset of predetermined test positions for successive parts of one or more audio tests of the user; and vii. holding a microphone proximate to the entrance of the user's ear canal using a microphone clip mountable on the ear.

14. A non-transitory, computer readable storage medium containing a computer program comprising computer executable instructions adapted to cause a computer system to perform an audio personalisation method for a user, by carrying out actions comprising:

testing the user with an audio test, the audio test comprising:

moving a portable device, comprising a position tracking mechanism and a speaker, to a plurality of predetermined test positions relative to the user's head;

playing a test sound through the speaker of the portable device when within a threshold distance of a predetermined test position; and detecting the test sound using a microphone at least proximate to each of the user's ears, and associating resulting measurement data with the corresponding test position, wherein the resulting measurement data derived from the detected test sounds is characteristic of the user's head morphology;

for a corpus of reference individuals for whom respective head-related transfer functions 'HRTF' s have been generated, comparing the measurement data from the user's audio test or an HRTF derived from this measurement data with corresponding measurement data of some or all respective reference individuals in the corpus or HRTFs of some or all respective reference individuals in the corpus;

identifying a reference individual whose measurement data or HRTF best matches the measurement data or HRTF from the user's audio test; and using the HRTF of the identified reference individual for the user.

15. An audio personalisation system for a user, comprising a portable device (43, 49), comprising in turn a position tracking mechanism and a speaker;

wherein the portable device is adapted to play a test sound through the speaker of the portable device when within a threshold distance of a predetermined test position and as the portable device is moved to a plurality of predetermined test positions relative to the user's head during an audio test of the user;

at least a first microphone (712) adapted to detect the test sound when at least proximate to each of the user's ears;

an association processor adapted to associate resulting user measurement data with the test position, wherein the resulting measurement data derived from the detected test sounds is characteristic of the user's head morphology;

a comparison processor adapted to compare the measurement data from the user's audio test or a head-related transfer function 'HRTF' derived from this measurement data with corresponding measurement data of some or all respective reference individuals in a corpus of reference individuals for whom respective HRTFs have been generated, or HRTFs of some or all respective reference individuals in the corpus;

an identification processor adapted to identify a reference individual whose measurement data or HRTF best matches the measurement data or HRTF from the user's audio test; and an adoption processor operable to cause the HRTF of the identified reference individual to be used for the user.

16. An audio personalisation system according to claim 15, in which the system comprises one of:
   i. a mobile phone or tablet operating as the portable device and as some or all of the audio personalisation system; and
   ii. a videogame controller operating as the portable device in conjunction with a videogame console operating as some or all of the audio personalisation system.

* * * * *